(12) United States Patent
Boinard et al.

(10) Patent No.: US 9,370,883 B2
(45) Date of Patent: Jun. 21, 2016

(54) CURVED LENSES AND RELATED METHODS

(75) Inventors: Eric Boinard, Dumbarton (GB); Pascal Boinard, Dumbarton (GB)

(73) Assignee: POLAROID EYEWEAR, LTD., Dunbarton (GB)

( * ) Notice: Subject to any disclaimer, the term of this patent is extended or adjusted under 35 U.S.C. 154(b) by 1065 days.

(21) Appl. No.: 13/447,348

(22) Filed: Apr. 16, 2012

(65) Prior Publication Data

US 2012/0262665 A1 Oct. 18, 2012

Related U.S. Application Data

(60) Provisional application No. 61/475,871, filed on Apr. 15, 2011.

(51) Int. Cl.
*B29D 11/00* (2006.01)
*G02C 7/12* (2006.01)
*B29C 43/02* (2006.01)
*B29C 43/20* (2006.01)
*G02B 5/30* (2006.01)
*G02B 27/28* (2006.01)

(52) U.S. Cl.
CPC ............ *B29C 43/021* (2013.01); *B29C 43/203* (2013.01); *B29D 11/0073* (2013.01); *B29D 11/00644* (2013.01); *G02B 5/3033* (2013.01); *G02B 27/286* (2013.01); *G02C 7/12* (2013.01)

(58) Field of Classification Search
CPC  B29C 43/021; B29C 43/203; B29D 11/0073; B29D 11/0064; G02B 5/3033; G02B 27/286; G02C 7/12
See application file for complete search history.

(56) References Cited

U.S. PATENT DOCUMENTS

| 2,099,694 | A |   | 11/1937 | Land |
|---|---|---|---|---|
| 2,298,429 | A | * | 10/1942 | Smith ........................... 264/2.4 |
| 2,431,942 | A |   | 12/1947 | Land |

(Continued)

FOREIGN PATENT DOCUMENTS

| EP | 0299509 | 1/1989 |
|---|---|---|
| EP | 0505998 | 9/1992 |

(Continued)

OTHER PUBLICATIONS

Bennett, Jean M. & Bennett, Harold E., Handbook of Optics, Section 10: Polarization, 10-1, 10-102, Paragraph 56, Walter G. Driscoll & Villiam Vaughan eds., 1978.

(Continued)

*Primary Examiner* — Yogendra Gupta
*Assistant Examiner* — Emmanuel S Luk
(74) *Attorney, Agent, or Firm* — Allen Dyer Doppelt Milbrath & Gilchrist, P.A.

(57) ABSTRACT

Curved lenses and methods for making curved lenses are described. One embodiment of a method of making a curved lens includes curving a lens blank made of a linear polarizer layer laminated together with a plurality of polymeric layers. The lens blank is curved by heating and pressing the lens blank between a convex member and a concave member at a first pressure, ramping the pressure sigmoidally to a higher pressure over a period of time, and maintaining the higher pressure for a time sufficient to allow the lens blank to conform to the shape of the convex member and concave member. Methods of the invention may be used to make curved lenses with different polarization properties and curvatures.

36 Claims, 8 Drawing Sheets

(56) References Cited

U.S. PATENT DOCUMENTS

| | | | |
|---|---|---|---|
| 2,454,515 A | 11/1948 | Land | |
| 3,528,722 A | 9/1970 | Makas | |
| 3,647,278 A | 3/1972 | Makas | |
| 3,720,555 A | 3/1973 | Ceppi | |
| 4,199,538 A | 4/1980 | Wu | |
| 4,877,307 A | 10/1989 | Kalmanash | |
| 5,061,042 A | 10/1991 | Nakamura et al. | |
| 5,751,481 A * | 5/1998 | Dalzell et al. | 359/485.03 |
| 5,805,336 A | 9/1998 | Dalzell et al. | |
| 5,997,139 A | 12/1999 | Yasuda | |
| 6,177,032 B1 | 1/2001 | Smith et al. | |
| 6,432,327 B2 | 8/2002 | Beeloo et al. | |
| 6,521,146 B1 | 2/2003 | Mead | |
| 6,549,335 B1 | 4/2003 | Trapani et al. | |
| 6,554,421 B1 | 4/2003 | Billard et al. | |
| 6,650,473 B2 | 11/2003 | Nakagoshi | |
| 6,801,360 B2 | 10/2004 | Phillips | |
| 6,813,906 B1 * | 11/2004 | Hirota et al. | 65/323 |
| 6,891,589 B2 | 5/2005 | Hata et al. | |
| 7,088,511 B2 | 8/2006 | Trapani et al. | |
| 7,106,509 B2 | 9/2006 | Sharp | |
| 7,289,257 B1 | 10/2007 | Nakagoshi | |
| 7,339,736 B2 | 3/2008 | Trapani et al. | |
| 7,517,081 B2 | 4/2009 | Lipton | |
| 7,524,053 B2 | 4/2009 | Lipton | |
| 7,852,561 B2 | 12/2010 | Chiba | |
| 7,854,506 B1 | 12/2010 | Johnson et al. | |
| 7,946,703 B2 | 5/2011 | Johnson et al. | |
| 8,100,525 B2 | 1/2012 | Johnson et al. | |
| 2001/0038438 A1 | 11/2001 | Beeloo et al. | |
| 2002/0050658 A1 * | 5/2002 | Richard | 264/1.32 |
| 2003/0214080 A1 | 11/2003 | Maki | |
| 2004/0227995 A1 | 11/2004 | Gettens | |
| 2005/0018095 A1 | 1/2005 | Kim | |
| 2005/0269020 A1 | 12/2005 | Matsuoka | |
| 2006/0197256 A1 * | 9/2006 | Tu | 264/219 |
| 2006/0285026 A1 | 12/2006 | Robinson | |
| 2007/0210465 A1 * | 9/2007 | Imatomi | 264/1.32 |
| 2007/0236809 A1 | 10/2007 | Lippey et al. | |
| 2007/0270062 A1 | 11/2007 | Weber | |
| 2009/0053353 A1 | 2/2009 | Chang | |
| 2009/0079934 A1 | 3/2009 | Su et al. | |
| 2009/0097117 A1 | 4/2009 | Coleman | |
| 2009/0165932 A1 | 7/2009 | Biteau | |
| 2009/0205773 A1 | 8/2009 | Nozaki | |
| 2010/0134884 A1 | 6/2010 | Johnson | |
| 2010/0193112 A1 | 8/2010 | Bovet et al. | |
| 2010/0226006 A1 * | 9/2010 | Bentley | 359/465 |
| 2011/0205626 A1 | 8/2011 | Saylor et al. | |

FOREIGN PATENT DOCUMENTS

| | | | |
|---|---|---|---|
| EP | 1217397 | 6/2002 | |
| EP | 1826594 | 8/2007 | |
| KR | 10-2004-0026032 | 3/2004 | |
| KR | 10-2007-0095101 | 9/2007 | |
| WO | 9738344 | 10/1997 | |
| WO | 9738345 | 10/1997 | |
| WO | 2007008777 | 1/2007 | |
| WO | WO 2009054835 A1 * | 4/2009 | G02C 7/12 |

OTHER PUBLICATIONS

International Search Report for PCT/IB/2012/00749 mailed Oct. 2, 2012.

Request for Ex Parte Reexamination of U.S. Pat. No. 7,854,506 issued Dec. 21, 2010 for Curved lenses Configured to Decode Three-Dimensional Content on Television and Computer Screens, Inventors David A. Johnson, et al.

International Search Report for PCT/IB2012/000752 mailed Oct. 16, 2012.

International Search Report for PCT/IB2012/000750 mailed Oct. 30, 2012.

* cited by examiner

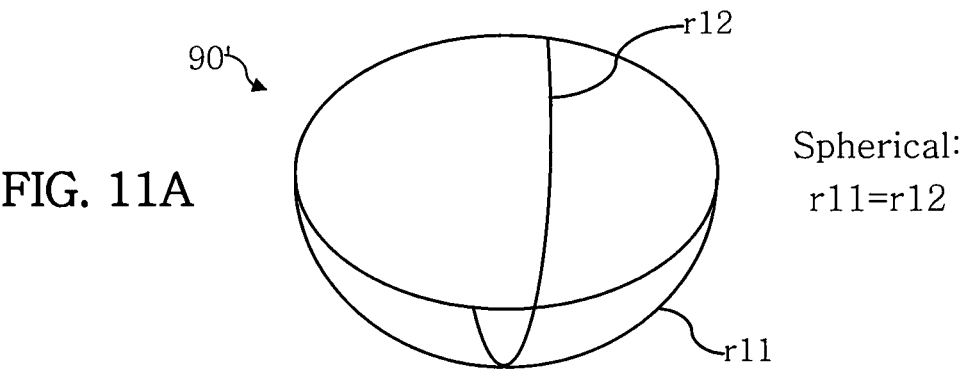
FIG. 11A — Spherical: r11=r12
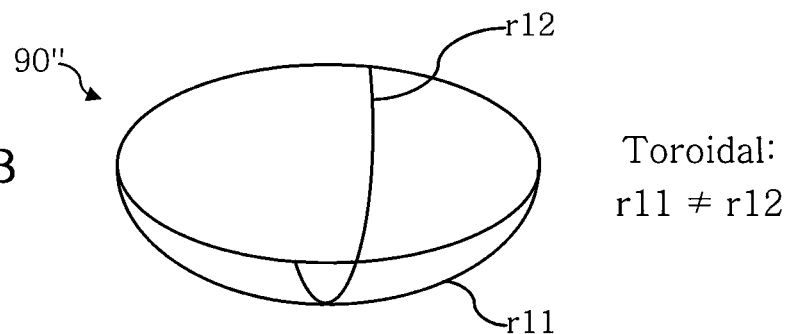
FIG. 11B — Toroidal: r11 ≠ r12
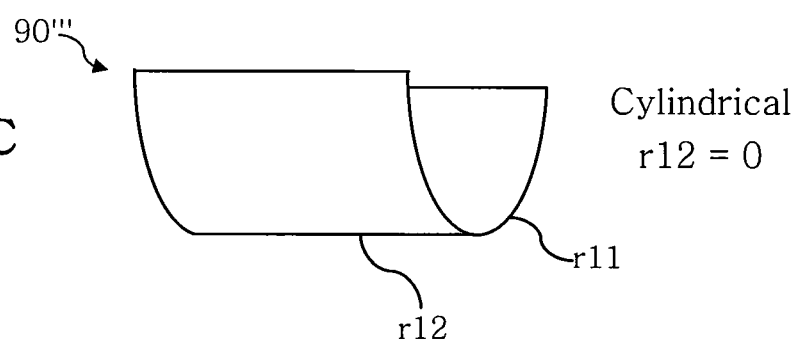
FIG. 11C — Cylindrical r12 = 0

CURVED LENSES AND RELATED METHODS

CROSS-REFERENCE TO RELATED APPLICATION

The application claims priority to U.S. Provisional Application Ser. No. 61/475,871 titled "Apparatus and Method for Shaping Light Polarizers," which was filed on Apr. 15, 2011 and is incorporated herein by reference in its entirety.

FIELD OF THE INVENTION

The invention relates to the field of polarized eyewear, and, more particularly, to curved polarized lenses and eyewear having curved polarized lenses.

BACKGROUND

Light polarizing lenses such as those incorporated into sunglasses or other eyewear are preferably shaped to comply with fashion trends, to minimize the amount of light that can disturb the wearer's peripheral vision and to minimize the appearance of reflections. Unfortunately, there are currently very few techniques that can transform planar polarizing lens blank materials into a curved lens. The techniques that exist may suffer from one or more of the following drawbacks: some may produce lenses with optical power, production is not adapted for efficient automation, some involve time consuming grinding processes, or the forming process damages the linear polarizer.

SUMMARY

In view of the foregoing, it is an object of the invention to provide curved polarized lenses having substantially no optical power, which can be produced according to efficiently automated processes that impart minimal damage to the delicate linear polarizer material.

According to a method aspect of the invention, a formed lens is prepared from a lens blank made of a linear polarizer layer laminated together with a plurality of polymeric layers, the linear polarizer layer having a polarization axis. The lens blank is heated and pressed between a convex member and a concave member at a first pressure. The pressure ramped sigmoidally to a higher pressure over a ramping time and the higher pressure is maintained for a time sufficient to allow the lens blank to conform to the shape of the convex member and concave member.

In another method aspect of the invention, a formed lens is prepared from a lens blank made of a linear polarizer layer laminated together with a plurality of polymeric layers, the linear polarizer layer having a polarization axis. The lens blank is heated to a forming temperature by pressing the lens blank at a first pressure between a convex member and a concave member, the convex member and concave member both being at the forming temperature. The pressure is ramped to a second pressure while heating at the forming temperature, wherein ramping from the first pressure to the second pressure is performed according to a sigmoidal pressure profile. The second pressure is maintained while heating at the forming temperature for allowing the lens blank to conform to the shape of the convex member and concave member. The temperature is reduced to a reduced temperature while maintaining the second pressure for allowing the lens blank to become a rigid lens having a convex side and a concave side. The rigid lens is then removed from between the convex member and concave member.

In another method aspect of the invention, eyewear is prepared from a first lens and a second lens made of a linear polarizer layer laminated together with a plurality of polymeric layers, the linear polarizer layer having a polarization axis. The first lens and second lens are formed from lens blanks into a desired shape according to the following steps: (i) heating and pressing the lens blanks separately between a convex member and a concave member at a first pressure, (ii) ramping the pressure sigmoidally to a higher pressure over a ramping time, and (iii) maintaining the higher pressure for a time sufficient to allow the lens blanks to conform to the shape of the convex member and concave member. The formed first and second lenses are then placed into an eyeglass frame.

The following are preferred forming parameters that may optionally be used in methods of the invention. Heating is preferably conducted at about 70° C. to about 200° C. The first pressure is about 0.75 to about 2.5 MPa. The second pressure is about 1.5 to about 32 MPa. The ramping time is preferably about 5 to about 150 seconds.

In some embodiments, a method may comprise cooling the lens blank while maintaining the second pressure. Cooling may be conducted at about 20° C. to about 90° C.

In some embodiments, a method may comprise, heating the lens blank to a temperature of between about 20° C. to about 150° C. prior to placing the lens blank between the convex member and concave member and pressing the lens blank at the first pressure.

In certain embodiments, at least one of the polymeric layers is an optical wave retarder having fast and slow axes and the fast retarder axis is aligned at an angle relative to the polarizer axis. The angle may be chosen to render the lens a linear polarizer, an elliptical polarizer, or a circular polarizer.

In embodiments in which the lens is a circular polarizer, an anti-reflective coating may be applied to the concave surface and convex surface of the formed lens. This advantageously allows the formed lens to have a parallel polarizer transmittance equal to or greater than 90% and a cross polarizer transmittance equal to or less than 0.5%.

In some embodiments, the shape of the convex member and concave member may be adjusted to produce a spherically, toroidally, or cylindrically shaped lens. A spherically shaped lens has a first radius of curvature and a second radius of curvature perpendicular to the first radius of curvature, wherein the first radius of curvature and second radius of curvature are equal. A toroidally shaped lens has a first radius of curvature and a second radius of curvature perpendicular to the first radius of curvature, wherein the first radius of curvature and second radius of curvature are not equal. A cylindrically shaped lens has a first radius of curvature and a second radius of curvature perpendicular to the first radius of curvature, wherein the first radius of curvature is non-zero and second radius of curvature is zero.

In some embodiments, the shape of the convex member and concave member produces a lens having non-uniform thickness with a maximum thickness of the lens being located proximal to the center of the lens, which advantageously allows the lens to have substantially no optical power.

Embodiments of the invention also include eyeglass lenses made according to method aspects of the invention.

These and other objects, aspects, and advantages of the present invention will be better appreciated in view of the drawings and following detailed description of the preferred embodiments.

BRIEF DESCRIPTION OF THE DRAWINGS

FIGS. 11A-C are schematics of spherically, toroidally, and cylindrically shaped lenses, respectively, made according to a method aspect of the invention;

DETAILED DESCRIPTION OF PREFERRED EMBODIMENTS

In the Summary above and in the Detailed Description of Preferred Embodiments, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

The term "comprises" is used herein to mean that other features, steps, etc. are optionally present. When reference is made herein to a method comprising two or more defined steps, the steps can be carried in any order or simultaneously (except where the context excludes that possibility), and the method can include one or more steps which are carried out before any of the defined steps, between two of the defined steps, or after all of the defined steps (except where the context excludes that possibility).

This invention may be embodied in many different forms and should not be construed as limited to the embodiments set forth herein.

A drawback of typical curved polarized lenses is that lenses of uniform thickness have optical power. Because the optical power increases with the thickness and curvature of a lens, increasing the thickness and/or the curvature of a lens, for the purpose of increasing its durability, undesirably increases the optical power. One process for making curved polarized lenses with substantially no optical power is described in U.S. Pat. No. 5,434,707 to Dalzell, which is incorporated herein by reference in its entirety. Dalzell's process involves pressing its lens making material between two heated glass molds in a single pressure application step. Unfortunately, the inventors have found that Dalzell's process may create a defect in the lenses known as "split haze," which results from the break-up of the delicate linear polarizer material when heat and pressure are applied. The thicker and curvier the lens, the more significant the damage to the linear polarizer material. Split haze reduces the optical clarity and diminishes the polarization efficiency of the lens.

As will be described below, the invention described here overcomes these drawbacks. The inventors have advantageously developed thick and durable curved lenses with minimal or no damage to the linear polarizer material using a unique forming process involving pressing the lens blanks in multiple pressure application stages.

Figure 1:
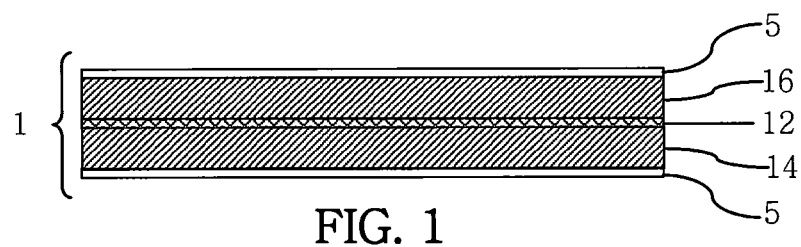
FIG. 1 is a side elevation view of a preferred composite light polarizer sheet that can be used to form a lens in accordance with an embodiment of the invention.
Figure 2:
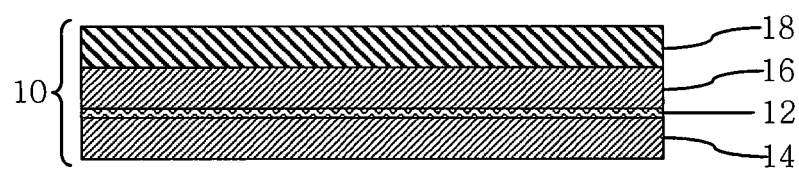
FIG. 2 is a side elevation view of another preferred composite light polarizer sheet that can be used to form a lens in accordance with an embodiment of the invention.
Figure 3:
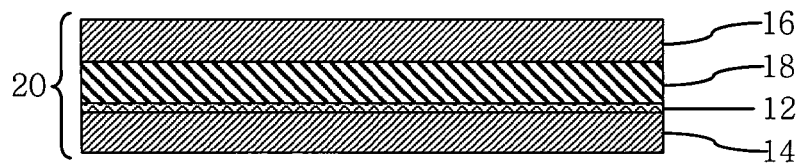
FIG. 3 is a side elevation view of another preferred composite light polarizer sheet that can be used to form a lens in accordance with an embodiment of the invention.

FIGS. 1-3 illustrate exemplary composite light polarizer sheets from which the curved polarized lenses of the invention may be formed. Referring initially to FIG. 1, an exemplary sheet 1 includes a polarizer layer 12 laminated between first and second polymeric layers 14, 16. A protective hard-coat layer 5 is coated on top of both polymeric layers 14, 16. Referring to FIG. 2 another exemplary sheet 10 includes a polarizer layer 12 laminated between first and second polymeric layers 14,16 and a retarder layer 18 laminated to the second polymeric layer 16. Referring now to FIG. 3, an alternative example of a sheet 20 includes a polarizer layer 12 laminated to a first polymeric layer 14 on one side and to a retarder layer 18 on the other side. A second polymeric layer 16 is laminated to the retarder layer 18 on the side of the retarder layer 18 that is opposite the polarizer layer 12.

The polarizer layer 12 is preferably a linear polarizer, which may be made of any number of suitable linear polarizer materials such as H-type or K-type polarizers. In a preferred example, the polarizer material is made from a linear molecularly oriented dichroic light-polarizing material. Such materials typically have a thickness in the range of about 0.025 to 0.076 mm. A preferred material to serve as the light polarizer is a layer of stretched (oriented) polyvinyl alcohol of about 0.025 mm thickness, which is stained with a dichroic dye such as iodine. Optionally, the polarizer may be borated to improve stability. Polarizers of this type are disclosed in U.S. Reissue Pat. Re. 23,297 and in U.S. Pat. No. 4,166,871.

Alternatively, the polarizer material may be a stretched polyvinyl alcohol (PVA) sheet containing polyvinylene light-polarizing species such as may be provided by typical hydrochloric acid vapor processing. Preferably, such polarizing material will be borated for improved stability. Suitable light-polarizing materials of this type can be prepared according to U.S. Pat. No. 2,445,555. Other light polarizing materials such as those described in U.S. Pat. Nos. 2,237,567; 2,527,400; and 2,554,850 may also be used. Regardless of the type of polarizer material used, the polarizer material may be sandwiched to or between one or more support layers, such as a polymeric material layer 14, 16 to provide mechanical strength to the polarizer layer 12.

The polymeric layers 14, 16 are preferably made from one or more thermoplastic polymers, which are polymers that can be formed to a desired shape by applying temperature and/or pressure. Suitable polymers include, but are not limited to, cellulose derivatives such as cellulose acetate, cellulose diacetate, cellulose triacetate, or cellulose acetate butyrate; acrylate derivatives such as polymethylmethacrylate (PMMA);

polycarbonates; polyamides, polyurethanes; polypropylenes; polyethylenes; or cyclo-olefin based polymers or copolymers. The polymeric material layers 14,16 may be made from a single layer of a single polymer, a single layer of a blend of polymers, multiple laminated layers of a single polymer, or multiple laminated layers made of different polymers or a blend of polymers.

It is preferred that the polymeric layers 14, 16 provide durability, mechanical strength, and scratch resistance to the sheet 12 and the finished curved lens made from the sheet 12. In some cases, it may be beneficial to use polymers that either carry or may be provided with a suitable protective coating such a polymeric hard coating 5 that can withstand the temperatures and pressures used in the forming process. Suitable protective coatings include polyurethanes, polyacrylates, or urea-based resins.

The retarder layer 18 is preferably made from a light transmissive birefringent material such as a cyclo-olefin based polymer or co-polymer. Other suitable materials that can be used to form the retarder layer 18 include, but are not limited to, acrylate based polymer, polypropylenes, polyesters, cellulose acetate based polymers, PVA, polystyrenes, polycarbonates, and norbornene based polymers and co-polymers.

One or more additives may be included in the polarizer layer 12, polymeric layers 14, 16 and/or retarder layer 18. For example, stabilizers, UV absorbers, and colorant dyes may be employed depending on the desired properties of the finished curved optical filter.

Figure 4:
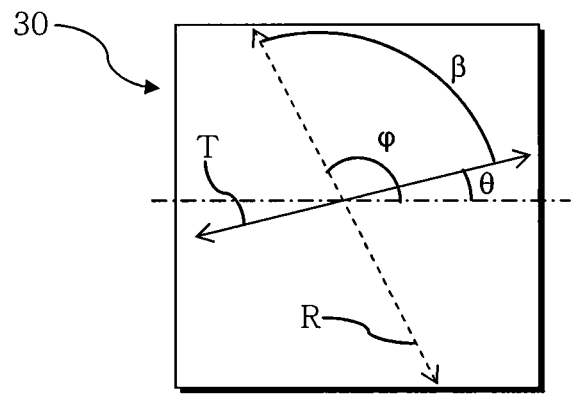
FIG. 4. is a plan view of a preferred composite light polarizer sheet from which a lens blank can be cut, showing the alignment of the transmission axis of the linear polarizer layer and the fast axis of the retarder layer.

The polarizer layer 12 and retarder layer 18 include axes that may be aligned relative to one another to produce a desired polarization effect. Referring to FIG. 4, an exemplary sheet 30 having polarizer layer 12 and a retarder layer 18 is shown. The polarizer layer 12 has a transmission axis T aligned at the angle $\theta$. The fast axis R of the retarder layer 18, is aligned at the angle $\phi=\theta+\beta$ where $\beta$ is the angular offset of the fast axis R of the retarder layer 18 relative to the transmission axis T of the polarizer layer 12. When $\beta=(n-1)(\pi/2)$ with n an integer, the two axes are either parallel or orthogonal to each other and the sheet 30 behaves as a linear polarizer. When $\beta=(2n-1)(\pi/4)$ with n an integer, the sheet 30 behaves as a circular polarizer. For any other values of $\beta$, the sheet 30 behaves as an elliptical polarizer.

In more detail, the linear polarizer layer 12 has a transmission axis T oriented at $\theta$ and defined by the Stoke vector of Eq. (1).

$$\frac{1}{2}\begin{pmatrix} S_0 + S_1 \cdot \cos2\theta + S_2 \cdot \sin2\theta \\ S_0 \cdot \cos2\theta + S_1 \cdot \cos^2 2\theta + S_2 \cdot \sin2\theta\cos2\theta \\ S_0 \cdot \sin2\theta + S_1 \cdot \sin2\theta\cos2\theta + S_2 \cdot \sin^2 2\theta \\ S_3 \end{pmatrix} \quad \text{Eq. (1)}$$

The polarizer comprises a linear polarizer layer 12 with transmission axis T orientated at $\theta$ and a retarder layer with its fast axis R aligned at $\phi$ defined by the Stoke vector of Equation 2.

$$\frac{1}{2}\begin{pmatrix} S_0 + \cos2\theta \cdot (S_1\cos^2 2\phi + S_2\cos2\phi\sin2\phi - S_3\sin2\phi) + \sin2\theta \cdot \begin{pmatrix} S_1\cos2\phi\sin2\phi + \\ S_2\sin^2 2\phi + S_3\cos2\phi \end{pmatrix} \\ \cos2\theta \cdot S_0 + \cos^2 2\theta \cdot (S_1\cos^2 2\phi + S_2\cos2\phi\sin2\phi - S_3\sin2\phi) + \sin2\theta\cos2\theta \cdot \begin{pmatrix} S_1\cos2\phi\sin2\phi + \\ S_2\sin^2 2\phi + S_3\cos2\phi \end{pmatrix} \\ \sin2\theta \cdot S_0 + \sin2\theta\cos2\theta \cdot (S_1\cos^2 2\phi + S_2\cos2\phi\sin2\phi - S_3\sin2\phi) + \sin^2 2\theta \cdot \begin{pmatrix} S_1\cos2\phi\sin2\phi + \\ S_2\sin^2 2\phi + S_3\cos2\phi \end{pmatrix} \\ S_1\sin2\phi - S_2\cos2\phi \end{pmatrix} S = \begin{pmatrix} S_0 \\ S_1 \\ S_2 \\ S_3 \end{pmatrix}. \quad \text{Eq. (2)}$$

defines the Stoke vector of light that is transmitted though the sheet 30.

Using these relationships any number of sheets 1, 10, 20, 30 configurations can be formed depending on the desired polarization properties of the sheet 1, 10, 20, 30 and the finished curved lens. In practice one may form a sheet 10, 20, 30 having desired polarization properties by predetermining the desired polarization properties of the sheet 10, 20, 30 and then forming the sheet 10, 20, 30 in such a way that the fast axis R of the retarder layer 18 is aligned at the desired angle relative to the polarization axis T of the polarizer layer 12 to achieve the desired polarization properties.

Figure 5:
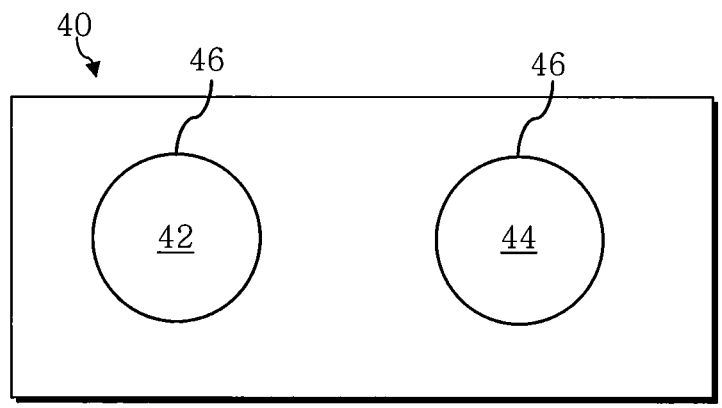
FIG. 5 is a plan view of a section of a composite light polarizer sheet, showing how lens blanks may be cut therefrom.
Figure 6:
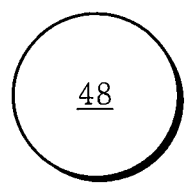
FIG. 6 is a plan view of a lens blank removed from the section of composite light polarizer sheet of FIG. 4.

In preparation for making a curved lens, lens blanks may be prepared by cutting and removing blanks of a size and shape suited for the production of the desired lens from a composite light polarizer sheet of the invention. A preferred method of preparing a blank to be formed into a lens is shown in FIG. 5, which is a plan view of a section of sheet 40 from which blanks 42, 44 are cut and removed. The blanks 42, 44 are prepared by making a cut 46 through the section of sheet 40. The cut 46 defines the perimeter of an individual blank 42, 44 from which a blank 48 can be removed as shown in FIG. 6. Suitable methods of making the cut 46 include the use of a rolling knife cutter, a reciprocal stamping cutter, a straight edge cutting knife, a rotary die, or a laser cutter.

Individual blanks, such as blank 48 shown in FIG. 6, may be formed into lenses in the manner described below. In certain embodiments, the blanks 48 may be subjected to one or more pre-forming treatments such as cleaning, coating, or polishing if desired.

A method by which a blank 48 of the invention is formed into a lens that is concave on one side and convex on the other side will now be described in connection with FIGS. 7 through 9.

Figure 7:
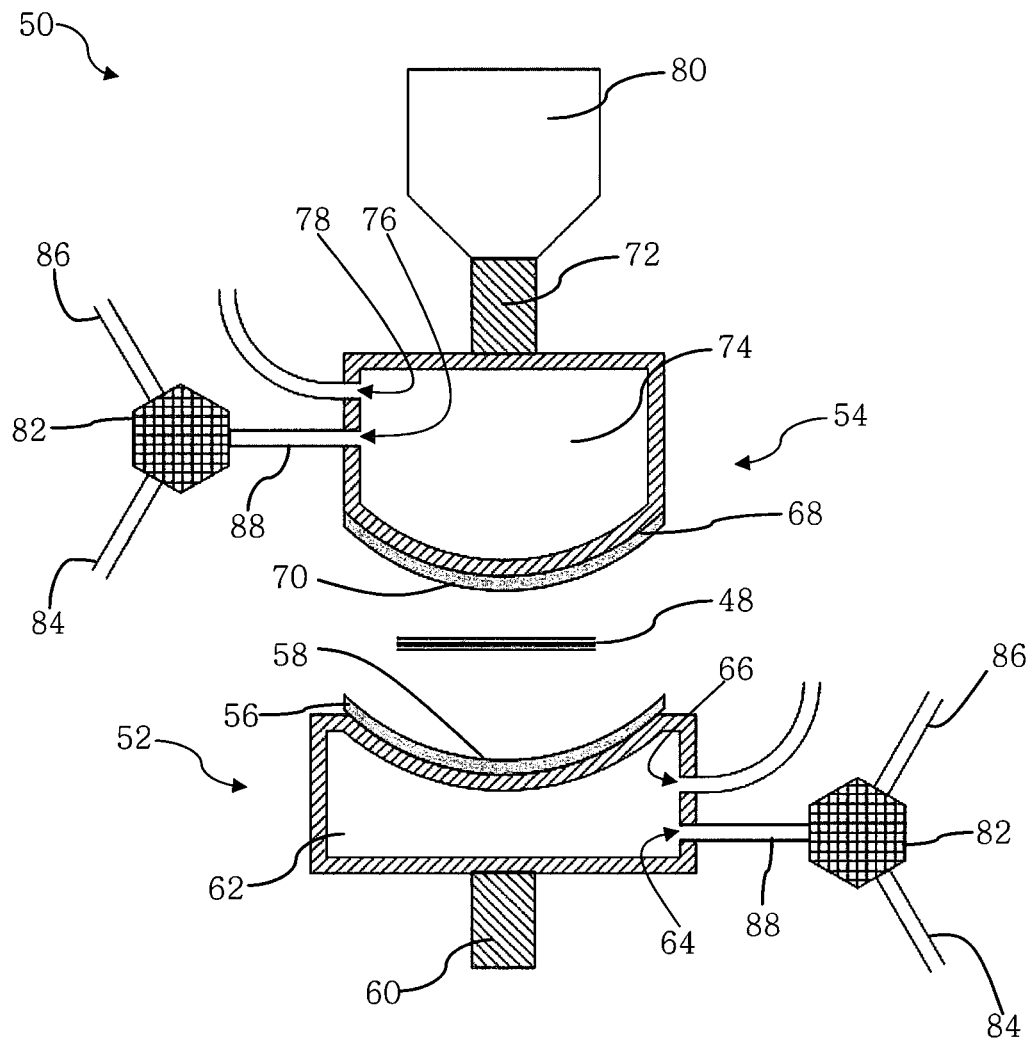
FIG. 7 is a cross-sectional view of an apparatus that can be used to curve lens blanks into lenses according to a method aspect of the invention.
Figure 8:
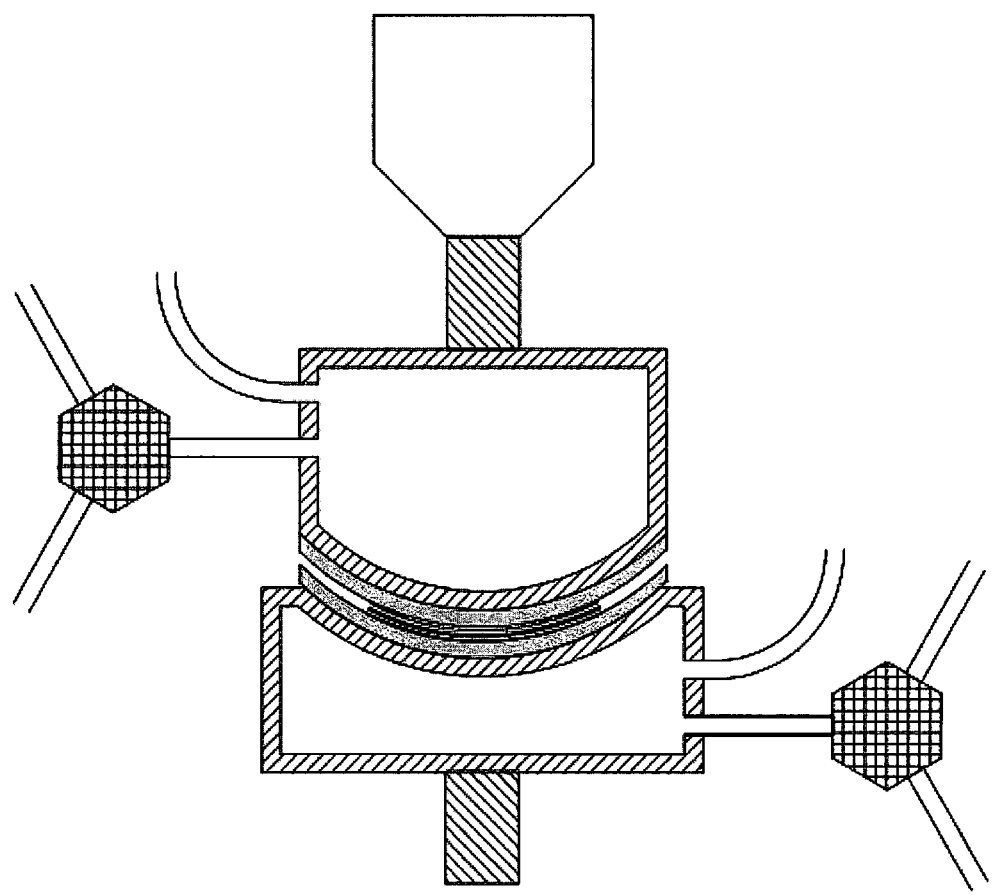
FIG. 8 is a cross-sectional view of the apparatus of FIG. 7 during a pressure stage of a method aspect of the invention.

The forming process can be carried out by an apparatus 50 of the type shown in FIG. 7. The apparatus includes concave platen 52, convex platen 54, a mechanism for driving the platens into and out of pressure-applying relationship with each other, and mechanism for alternately heating and cooling the platens during each pressure-applying interval.

Concave platen 52 includes a metal member 56, a fixed support 60, a fluid chamber 62, fluid inlet coupling 64, and fluid outlet coupling 66. The metal member 56 has a smooth concave forming surface 58.

Convex platen 54 includes metal member 68, shaft 72 operatively connected to a suitable drive mechanism, fluid chamber 74, fluid inlet coupling 76 and fluid outlet coupling 78. The metal member 68 has a smooth convex forming surface 70.

The use of the metal members 56, 68 is advantageous over conventional lens press molds such as the glass molds described in Dalzell. Due to their fragility and complexity, the glass molds only allowed for spherical lenses to be formed. Moreover, concave and convex glass molds would not be able to withstand the higher pressures needed to form some of today's thicker and tougher curved lenses, such as the lenses of the invention. Further, metal members 56, 68 with different shapes may be interchanged to match a desired lens curvature. Therefore, rather than just being able to form spherically curved lenses, as one would with the conventional glass molds, the invention allows for toroidally or cylindrically shaped lenses to be formed simply by selecting a suitably shaped set of metal members 56, 68. Furthermore, metal members 56, 68 can be designed with a de-centered curvature allowing to form lenses with their optical centres away from their geometric centres. This is of special interest in minimizing the potential prismatic power effect that can be generated when mounting thick lenses with high curvatures in an eyeglass frame of the wrap-around style. Due to the fragility and low heat transfer of glass, lens de-centering would be difficult to achieve with glass molds.

A preferred drive mechanism includes a suitable hydraulic piston and cylinder arrangement 80 operatively connected to convex platen 54 for moving the convex platen 54 into and out of pressure-applying relationship with the concave platen 52.

A preferred heating and cooling mechanism for both platens 52, 54 includes a three-way valve 82, a heating fluid conduit 84, a cooling fluid conduit 86, and fluid inlet 88 connecting one of the three way valves 82 to each of fluid inlet couplings 64, 76 of the platens 52, 54 respectively.

In forming a curved lens, a blank 48 is placed on the smooth concave forming surface 58. The the smooth concave forming surface 58 and the smooth convex forming surface 70 are then moved into contact with the blank 48 as shown in FIG. 8.

The inventors discovered that the undesirable "split haze" effect discussed previously is avoidable by applying pressure to the blank 48 in multiple pressure application stages. In a first pressure stage relatively low pressure is applied to allow for efficient heat transfer to the blank 48. This is followed by a second pressure stage in which the pressure is ramped over a pre-determined time period, allowing for a smooth flow of the blank 48 material, thereby preventing damage to the polarizer layer 12.

In the first pressure stage, relatively low pressure is applied in order to transfer heat from the surfaces 58, 70 to the blank 48. In the second pressure stage, the pressure is ramped in order to form or shape the blank 48, by the combined effects of pressure and temperature, into a shaped lens of non-uniform thickness characterized by concave and convex opposed surfaces and maximum thickness in the central region of the lens.

The amount of pressure applied, the pressure profile and the time delay between the first and second pressure stages may be adjusted depending on the characteristics of the blank 48, with the temperatures of the forming surfaces 58 and 70 and with the curvature intended to be given to the blank 48.

Figure 10:
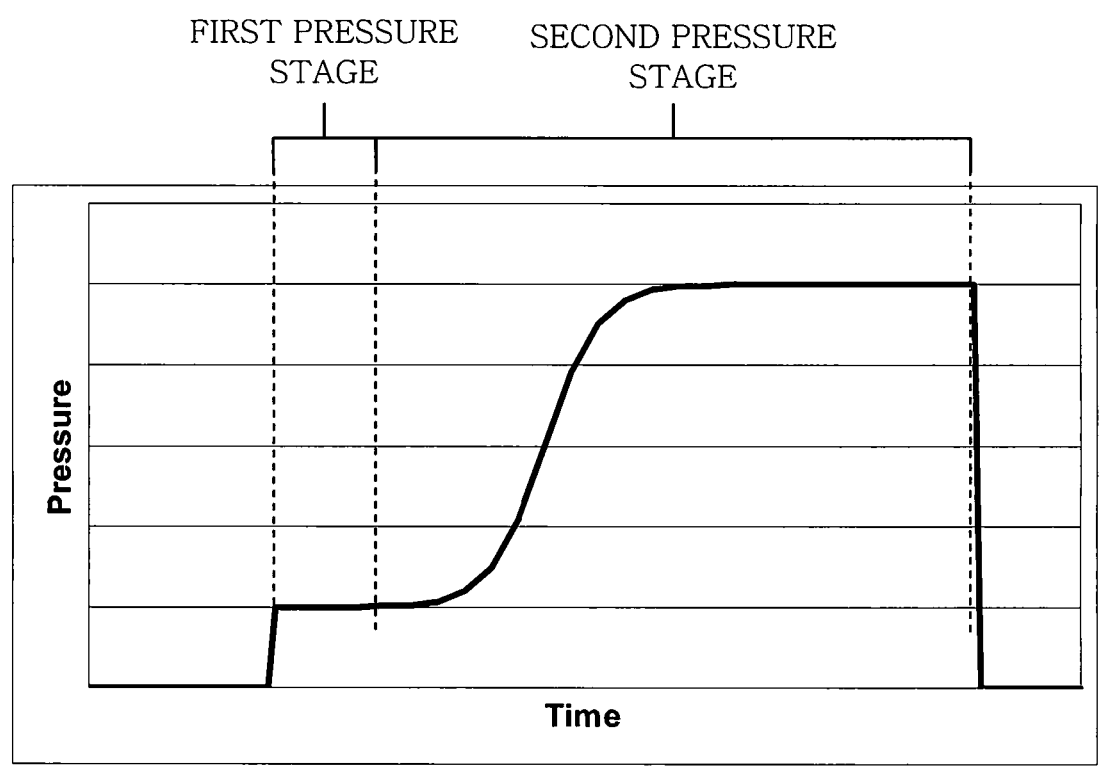
FIG. 10 is a line graph showing a typical sigmoidal pressure profile used in forming a lens blank into a curved lens, according to a method aspect of the invention.

A typical ramping pressure profile is presented in FIG. 10. In a preferred embodiment, the pressure applied to the blank 48 during the first pressure stage is in the range of about 0.75 to about 2.50 MPa and the pressure applied to the blank in the second stage is in the range of about 1.50 to about 32 MPa. The pressure is preferably ramped between the first pressure and second pressure according to a sigmoidal pressure profile as shown. A preferred range for the ramping time is 1 second or more, or more preferably about 5 seconds to about 150 seconds.

During the pressure stages, the platens 52, 54 are heated by passing hot fluid through the fluid chambers 62, 74 of platens 52 and 54, respectively. Surfaces 58 and 70 are continually heated sufficiently to cause deformation and flow of the lens blank 48 material and conformation of the surfaces of blank 48 to the forming surfaces 58, 70. Thermoplastic flow and application of pressure by the platens 52, 54 onto the blank 48 therebetween causes the blank 48 to deform and fill the space between the platens 52, 54, producing a curved polarizer of non-uniform thickness and substantially no optical power.

If the conditions of temperature and pressure are insufficient to cause the blank 48 to fill the space between the forming surfaces 58, 70, the blank 48 will retain its uniform thickness, thereby resulting in a lens having optical power.

In the production of a curved lens of the invention, it will be convenient to utilize a platen 52 having a forming surface 58 corresponding to a predetermined curvature of the convex side of the lens to be formed. The convex surface of the lens, formed against forming surface 58, may serve as the outer surface of an eyeglass lens. A suitable radius of curvature for surface 58 for forming a convex lens surface is about 50 to about 270 mm, or about 65 to about 90 mm. In a particular embodiment, the radius of curvature is about 87.2 mm.

The temperature sufficient to cause the blank 48 to deform may vary with the chemical composition of the blank's 48 composite structure. A preferred heating temperature range is between about 70° C. to about 200° C. Another preferred heating range is between about 90° C. to about 110° C. One particular preferred heating temperature is about 105° C.

In some cases it may be helpful to pre-heat the blank 48 before applying pressure. Suitable pre-heating temperatures are within the range of about 20° C. to about 150° C.

The temperature of the forming surfaces 58, 70 of the platens 52, 54 can be controlled by the passage of heated fluid and cooled fluid, as described previously. The platens 52, 54 are preferably preheated, prior to placement of the blank therebetween, to the desired forming temperature for a heating cycle sufficient to provide the desired shaped lens. The desired forming temperature is maintained for a duration sufficient to effect desired lens formation. Although not limiting, a suitable duration is between about 80 to about 90 seconds. Thereafter, the temperature of the forming surfaces 58, 70 is reduced by passing a cooling fluid, through the fluid chambers 62, 74 of the platens 52, 54. The cooling fluid is passed through the platens 52, 54 for a time sufficient to cool the formed lens. Although not limiting, a suitable cooling duration is about 30 seconds. Cooling temperatures from about 20° C. to about 35° C. provide good results, but other cooling temperatures are also contemplated.

Hot fluid is supplied to the platens 52, 54 through the heating fluid conduits 84 and the relatively cool fluid is supplied through the cooling fluid conduits 86. During the heating cycle, the valves 82 open a connecting passage between the heating fluid conduits 84 and the respective inlets 64, 76 and closes the cooling fluid conduit 86. During the cooling cycle, the valves 82 open a connecting passage between the cooling fluid conduits 86 and the respective inlets 64, 76 and closes the heating fluid conduit 84. The transition from the heating cycle to the cooling cycle is carried out by operating valves 82 to mix cool fluid with the hot fluid until the hot fluid is completely displaced by cool fluid. Transition from the cooling cycle to heating cycle is carried out by reversing the operation.

Figure 9:
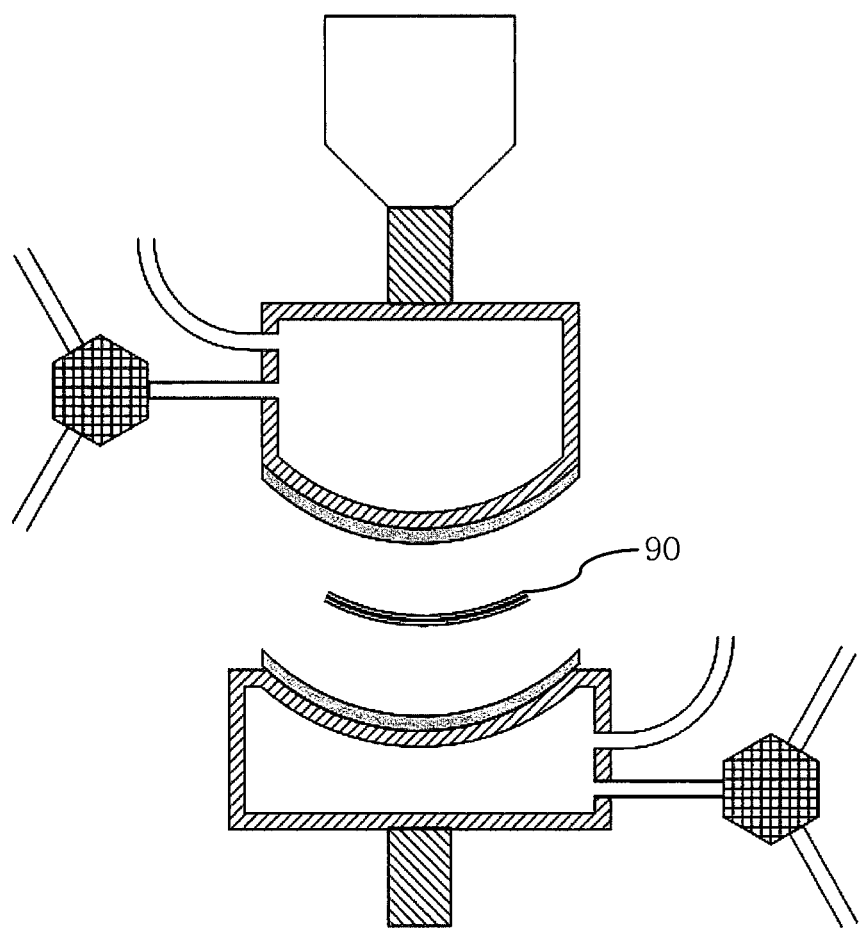
FIG. 9 is a cross-sectional view of the apparatus of FIG. 7, showing a curved lens removed from the apparatus.

After the cooling operation, the platens 52, 54 are separated to relieve the pressure on the formed lens 90 and permit its removal, as shown in FIG. 9. If the formed lens 90 adheres to one of the platens 52, 54, it may be removed by applying a stream of compressed air.

One or more coatings can be applied on the concave and/or convex surfaces of the formed lens 90 using conventional vacuum deposition techniques. The inventors discovered that applying an anti-reflective coating to the convex and concave surfaces of a circular polarizer lens of the invention can significantly improve the transmittance % of the finished circular polarizer lens.

The method described above can also include repeating each of these steps using a series of concave and convex platens 52, 54 for the shaping of blanks 48 to each of a series of convex lens surfaces, each of such surfaces having a different curvatures within a desired range of curvatures, thus providing a series of lenses, each having a different convex surface within a desired range of curvatures.

A lens of the invention may also gradually be shaped to a desired form by repeating the steps and gradually increasing the curvature of the platens 52, 54 prior to each repetition. This can be accomplished using a series of platens 52, 54 with each set in the series having an increased curvature relative to the prior set.

The shape of a formed lens of the invention will substantially correspond to the shape of the forming surfaces 58, 70. Accordingly, different shaped forming surface 58, 70 can be used to form lenses with different curvatures. For example, a pair of spherically shaped, a pair of cylindrically shaped, or a pair of toroidally shaped forming surfaces 58, 70 can be used to form spherically curved, cylindrically curved, and toroidally curved light polarizer lenses, respectively.

For spherically, toroidally, and cylindrically curved lenses, the shape of the lens, along the first principal meridian corresponds substantially to the relationship $(n-1)[1/r11-1/r21+((n-1)/n) t/(r11 r21)]=0$, the shape of the lens along the second principal meridian, perpendicular to the first principal meridian, corresponds substantially to the relationship $(n-1)[1/r12-1/r22+((n-1)/n) t/(r12 r22)]=0$, t represents the thickness of the blank 48, n is its index of refraction, r11 an r12 are the radii of curvature of each principal meridian of the concave forming surface 58 and r21 and r22 are the radii of curvature of each principal meridian of the convex forming surface 70. In preferred embodiments, r11, r12, r21 and r22 are typically in the range of about 1 to about 10 diopters and the thickness is typically in the range of about 0.2 mm to about 2.5 mm. To form a spherically curved lens r11 equals r12 and r21 equals r22. To form a toroidally curved lens r11 is different from r12 and r21 is different from r22. To form a cylindrically curved lens, r11 is different from r12 and r12 is about 0 diopters. This relationship can also apply to other shaped curvatures.

FIGS. 11A-C depict a formed spherical lens 90', a formed toroidal lens 90", and a formed cylindrical lens 90''', respectively. The curvature of each lens 90', 90", 90''' is characterized by a first radius of curvature r11 and a second radius of curvature r12. The lines along which r11 and r12 are determined are indicated. For a spherically curved lens 90', r11 equals r12. For toroidally curved lens 90", r11 is different from r12. For a cylindrically curved lens 90''', r12 is about 0 diopter.

Figure 12:
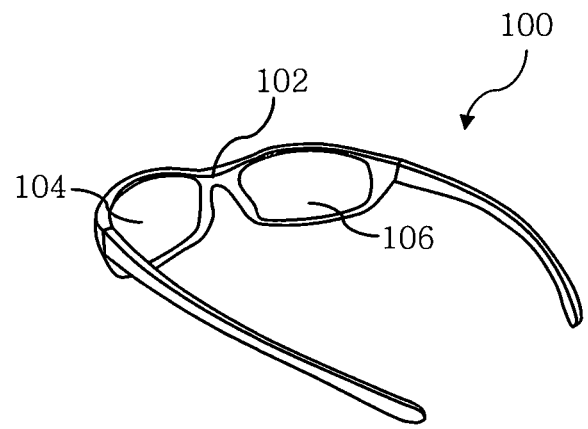
FIG. 12 is a perspective view of eyeglasses incorporating lenses of the invention.

Another object of the invention is to provide polarized eyewear that includes two lenses of the invention. Referring to FIG. 12, the eyewear 100 includes an eyeglass frame 102, a first lens 104 and a second lens 106. The lenses 104, 106 may be the same or different, depending on the desired use of the eyewear. For the manufacture of linear polarized eyewear, the first lens 104 and second lens 106 are identical. The sheet used for these lenses will have a stoke vector as described in Equation 1 with the polarizer axis orientated parallel to the horizontal ($\theta=0$). In some preferred examples for stereoscopic use, both lenses are made of linear polarizer sheet having a stoke vector as described in Equation 1 with the polarizer axis of the first lens 104 orientated at $\theta$ and the polarizer axis of the second lens 106 orientated at $\theta+\pi/2$. In a further preferred example for stereoscopic use, the sheet material comprises a retarder layer 18 and has a Stoke vector as described in Equation 2. The first lens 104 has its polarizer axis T orientated at $\theta$ and fast axis of the retarder R orientated at $\phi=\theta+\beta$ and the second lens 106 has its polarizer axis T orientated at $\theta$ and fast axis of the retarder R orientated at $\phi=\theta-\beta$.

EXAMPLES

In this section, certain illustrative embodiments of the invention are described. These are provided by way of example only and, therefore, do not limit the scope of the invention.

Example 1

Preparation of a Lens of the Invention

Figure 13:
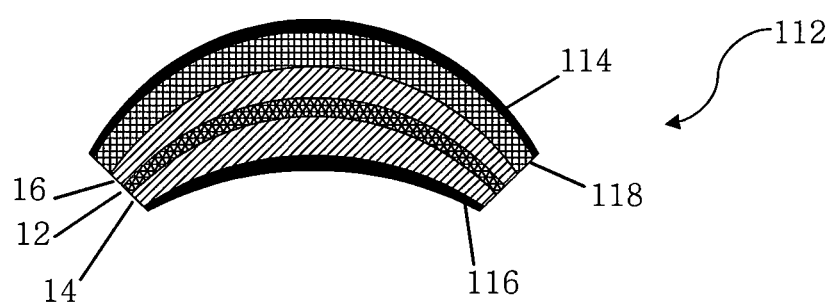
FIG. 13 is a cutaway view of a curved lens including a hard coating in accordance with an embodiment of the invention.

A spherically shaped linear polarizer lens of the invention was prepared using the method and apparatus described above. The structure of the lens 112 will be better understood by referring to FIG. 13. The lens 112 was formed from a total of six layers of material including a polarizer layer 12, a first polymeric layer 14, a second polymeric layer 16, a third polymeric layer 118, a first hard coat layer 114 and a second hard coat layer 116. The lens has its maximum thickness in the central portion. The materials used to make the lens 112, the properties of the platens, and the forming parameters are all specified in TABLE 1.

TABLE 1

Materials and Parameters Used to Form an Exemplary Lens of the Invention

| Lens Materials | Layer 1 (114) | | hardcoat |
|---|---|---|---|
| | Layer 2 (118) | | cellulose triacetate |
| | Layer 3 (16) | | cellulose triacetate |
| | Layer 4 (12) | | stretched PVA with iodine |
| | Layer 5 (14) | | cellulose triacetate |
| | Layer 6 (116) | | hardcoat |
| | Thickness of blank material | | 0.8 mm |
| Platens | Material | | steel |
| | Radius (r11 = r21) | | 87.2 mm |
| Forming Parameters | Temperatures | pre-heating | 50-70° C. |
| | | heating | 90-100° C. |
| | | cooling | 20-35° C. |

TABLE 1-continued

Materials and Parameters Used to Form an Exemplary Lens of the Invention

| | | |
|---|---|---|
| Pressures | stage 1 | 1.4-1.6 MPa |
| | stage 2 | 8-10 MPa |
| | ramping time | 8-12 seconds |

Example 2

Figure 14:
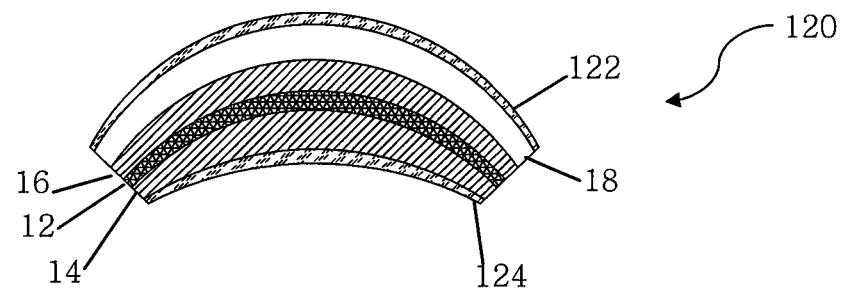
FIG. 14 is a cutaway view of a curved lens including an anti-reflective coating in accordance with an embodiment of the invention.

Improvement of Transmittance Using Anti-Reflective Coatings on Circular Polarized Lenses Circular polarizer lenses of the invention were coated on both the convex and concave surfaces with an anti-reflective coating in order to determine whether an anti-reflective coating can improve the transmittance % within the wavelength range of 280 to 700 nm, which includes the visible light spectrum. The structure of a circular polarized lens including an antireflective coating will be better understood with reference to FIG. 14 in which the lens 120 includes a polarizer layer 12, a first polymeric layer 14, a second polymeric layer 16, a retarder layer 18, a first antireflective coating layer 122 and a second antireflective coating layer 124.

TABLE 2 shows results of typical transmittance % improvement.

TABLE 2

Transmittance Improvement Data

| Anti-reflective coating applied? | Cross polarizer transmittance (%) | Parallel polarizer transmittance (%) |
|---|---|---|
| NO | 0.02 | 82 |
| YES | 0.03 | 90 |

The application of an anti-reflective coating is used regularly in eyewear products. For both sunglass and corrective eyewear it is applied to the back of the lens to minimize disturbing back reflections on the lens from light sources situated behind the wearer. For corrective eyewear, it is also applied at the front of the lens for cosmetic reasons, namely in order to prevent reflections from the front of the lenses, making the eyewear less noticeable.

We found that when anti-reflective coatings are applied to stereoscopic eyewear as described in this example, the coating advantageously and significantly increases the transmittance of the light the lens is designed to transmit without increasing the transmittance of the light the lens is designed to block. In this case, the lenses were designed to maximize the parallel polarizer transmittance, while minimizing the cross-polarizer transmittance. The results show that the anti-reflective coating allowed us to increase by the parallel polarizer transmittance by 8% with minimal increase in the cross-polarizer transmittance. This is especially important to 3D projection operators, such as cinema operators, since a significant amount of light is lost in the 3D display. The ability of the eyewear to transmit more light allows the operators to use less powerful light sources resulting in significant operational cost savings.

The present invention has been described hereinabove with reference to the accompanying drawings, in which preferred embodiments of the invention are shown. Unless otherwise defined, all technical and scientific terms used herein are intended to have the same meaning as commonly understood in the art to which this invention pertains and at the time of its filing. Although various methods and materials similar or equivalent to those described herein can be used in the practice or testing of the present invention, suitable methods and materials are described. The skilled should understand that the methods and materials used and described are examples and may not be the only ones suitable for use in the invention.

Accordingly, this invention may be embodied in many different forms and should not be construed as limited to the illustrated embodiments set forth herein. The invention has been described in some detail, but it will be apparent that various modifications and changes can be made within the spirit and scope of the invention as described in the foregoing specification and as defined in the appended claims.

That which is claimed is:

1. A method of making a formed lens, the method comprising:
    obtaining a lens blank comprising, in superposed relation, a linear polarizer layer laminated together with a plurality of polymeric layers, the linear polarizer layer having a polarization axis;
    heating the lens blank while pressing the lens blank between a convex member and a concave member to maintain a first pressure;
    ramping the pressure sigmoidally to a second pressure, higher than the first pressure, over a ramping time; and
    maintaining the second pressure for a time sufficient to allow the lens blank to conform to the shape of the convex member and concave member.

2. The method of claim 1, wherein heating is conducted at about 70° C. to about 200° C.

3. The method of claim 1, wherein the first pressure is about 0.75 MPa to about 2.50 MPa.

4. The method of claim 1, wherein the second pressure is about 1.5 MPa to about 32 MPa.

5. The method of claim 1, wherein the ramping time is about 5 to about 150 seconds.

6. The method of claim 1, further comprising cooling the lens blank while maintaining the second pressure.

7. The method of claim 6, wherein cooling is conducted at about 20° C. to about 90° C.

8. The method of claim 1, further comprising, preheating the lens blank to a temperature of about 20° C. to about 150° C. prior to applying the first pressure.

9. The method of claim 1, wherein at least one of the polymeric layers is an optical wave retarder having a fast axis and the fast axis is aligned at an angle relative to the polarizer axis.

10. The method of claim 9, wherein the angle renders the lens a linear polarizer.

11. The method of claim 9, wherein the angle renders the lens an elliptical polarizer.

12. The method of claim 9, wherein the angle renders the lens a circular polarizer.

13. The method of claim 9, further comprising coating a concave surface and a convex surface of the formed lens with an anti-reflective coating.

14. The method of claim 13, wherein the formed lens has a parallel polarizer transmittance equal to or greater than 90% and a cross polarizer transmittance equal to or less than 0.5%.

15. The method of claim 1, wherein shapes of the convex member and concave member produce a spherically shaped lens having a first radius of curvature and a second radius of curvature perpendicular to the first radius of curvature, wherein the first radius of curvature and second radius of curvature are equal.

16. The method of claim 1, wherein shapes of the convex member and concave member produce a toroidally shaped lens having a first radius of curvature and a second radius of curvature perpendicular to the first radius of curvature, wherein the first radius of curvature and second radius of curvature are not equal.

17. The method of claim 1, wherein shapes of the convex member and concave member produce a cylindrically shaped lens having a first radius of curvature and a second radius of curvature perpendicular to the first radius of curvature, wherein the first radius of curvature is non-zero and the second radius of curvature is zero.

18. The method of claim 1, wherein shapes of the convex member and concave member produce a lens having non-uniform thickness.

19. A method of making a formed lens, the method comprising:
- obtaining a lens blank comprising, in superposed relation, a linear polarizer layer laminated together with a plurality of polymeric layers, the linear polarizer layer having a polarization axis;
- heating the lens blank to a forming temperature while pressing the lens blank between a convex member and a concave member to maintain a first pressure, the convex member and concave member both being at the forming temperature;
- ramping the pressure to a second pressure while heating at the forming temperature, wherein ramping from the first pressure to the second pressure is performed according to a sigmoidal pressure profile;
- maintaining the second pressure while heating at the forming temperature for allowing the lens blank to conform to shapes of the convex member and concave member;
- reducing the temperature to a reduced temperature while maintaining the second pressure for allowing the lens blank to become a rigid lens having a convex side and a concave side; and
- removing the rigid lens from between the convex member and concave member.

20. The method of claim 19, wherein the forming temperature is about 70° C. to about 200° C.

21. The method of claim 19, wherein the first pressure is about 0.75 MPa to about 2.50 MPa.

22. The method of claim 19, wherein the second pressure is about 1.5 MPa to about 32 MPa.

23. The method of claim 19, wherein a time for ramping from the first pressure to the second pressure is about 5 to about 150 seconds.

24. The method of claim 19, wherein the reduced temperature is about 20° C. to about 90° C.

25. The method of claim 19, further comprising, preheating the lens blank to a temperature of about 20° C. to about 150° C. prior to applying the first pressure.

26. The method of claim 19, wherein at least one of the polymeric layers is an optical wave retarder having a fast axis and the fast axis is aligned at an angle relative to the polarizer axis.

27. The method of claim 26, wherein the angle renders the lens a linear polarizer.

28. The method of claim 26, wherein the angle renders the lens an elliptical polarizer.

29. The method of claim 26, wherein the angle renders the lens a circular polarizer.

30. The method of claim 26, further comprising coating a concave surface and a convex surface of the formed lens with an anti-reflective coating.

31. The method of claim 30, wherein the formed lens has a parallel polarizer transmittance equal to or greater than 90% and a cross polarizer transmittance equal to or less than 0.5%.

32. The method of claim 19, wherein the shape of the convex member and concave member produce a spherically shaped lens having a first radius of curvature and a second radius of curvature perpendicular to the first radius of curvature, wherein the first radius of curvature and second radius of curvature are equal.

33. The method of claim 19, wherein the shape of the convex member and concave member produce a toroidally shaped lens having a first radius of curvature and a second radius of curvature perpendicular to the first radius of curvature, wherein the first radius of curvature and second radius of curvature are not equal.

34. The method of claim 19, wherein the shape of the convex member and concave member produce a cylindrically shaped lens having a first radius of curvature and a second radius of curvature perpendicular to the first radius of curvature, wherein the first radius of curvature is non-zero and the second radius of curvature is zero.

35. The method of claim 19, wherein the shape of the convex member and concave member produce a lens having non-uniform thickness.

36. A method of making eyewear, the method comprising:
(a) obtaining a first lens and a second lens, the first lens and second lens comprising, in superposed relation, a linear polarizer layer laminated together with a plurality of polymeric layers, the linear polarizer layer having a polarization axis, the first lens and second lens being formed from lens blanks into a desired shape according to the following steps:
 (i) pressing the lens blanks separately between a convex member and a concave member to maintain a first pressure while heating the lens blanks;
 (ii) ramping the pressure sigmoidally to a higher pressure over a ramping time; and
 (iii) maintaining the higher pressure for a time sufficient to allow the lens blanks to conform to the shape of the convex member and concave member; and
(b) placing the first lens and second lens into an eyeglass frame.

* * * * *